Feb. 12, 1963　　O. C. NIEDERER ETAL　　3,077,257
EGG HANDLING EQUIPMENT
Filed Jan. 11, 1960　　　　　　　　　　　　　　4 Sheets-Sheet 1

INVENTORS
OTTO C. NIEDERER
HERBERT O. NIEDERER
BY　*Albert Sperry*.
ATTORNEY

Feb. 12, 1963    O. C. NIEDERER ETAL    3,077,257
EGG HANDLING EQUIPMENT
Filed Jan. 11, 1960    4 Sheets-Sheet 2

INVENTORS
OTTO C. NIEDERER
HERBERT O. NIEDERER
BY Albert Sperry
ATTORNEY

INVENTORS
OTTO C. NIEDERER
HERBERT O. NIEDERER
BY Albert Sperry
ATTORNEY

Feb. 12, 1963  O. C. NIEDERER ETAL  3,077,257
EGG HANDLING EQUIPMENT
Filed Jan. 11, 1960
4 Sheets-Sheet 4
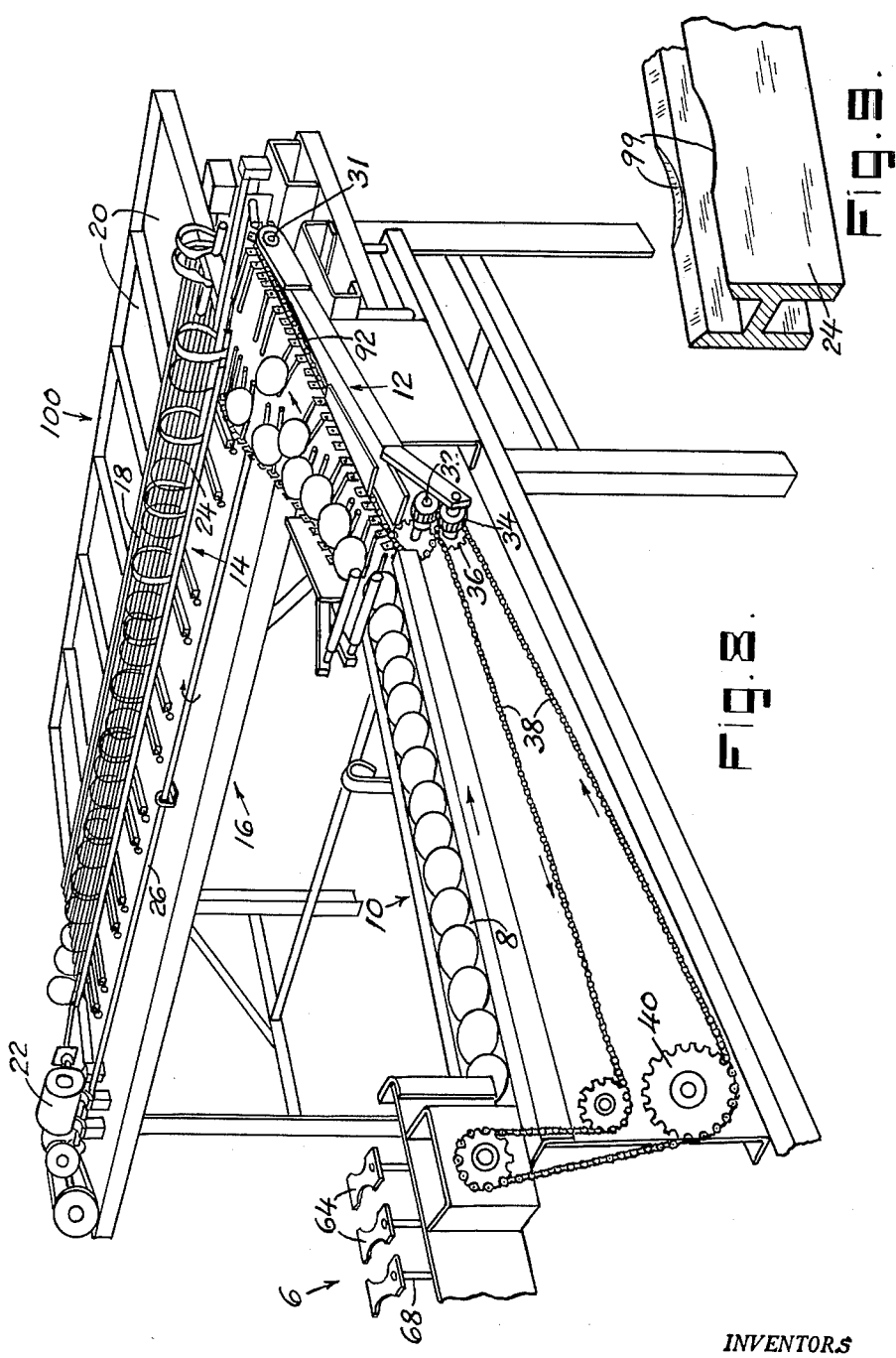
INVENTORS
OTTO C. NIEDERER
BY HERBERT O. NIEDERER
Albert Sperry
ATTORNEY

United States Patent Office 3,077,257
Patented Feb. 12, 1963

3,077,257
EGG HANDLING EQUIPMENT
Otto C. Niederer, Bear Tavern Road, and Herbert O. Niederer, Church Road, both of Titusville, N.J.
Filed Jan. 11, 1960, Ser. No. 1,741
3 Claims. (Cl. 198—31)

This invention relates to egg handling equipment and is directed particularly to egg conveying means whereby the rate and manner in which the eggs are moved at different stations along a path of travel are varied to permit the most efficient handling thereof.

In the handling of eggs in modern plants, it is frequently necessary to transfer a full tray, consisting of 30 eggs, from one point to another whereas the operations of candling and grading eggs requires each egg to be inspected and weighed separately. Moreover, the rate at which eggs can be passed through a candling station and a weighing station is not always the same as the rate at which they can be handled at loading and packing stations. For this reason, it is frequently found that eggs will accumulate at one staton while other stations are waiting for eggs. Moreover, in the candling of eggs it has been found that the candling operation can be speeded up considerably if the eggs are arranged so that the larger ends thereof in which the air cell is present are always disposed at the same side of the candler. This arranging of the eggs simplifies inspection and assures greater accuracy in candling the eggs.

In accordance with the present invention, novel means are provided for transferring eggs smoothly and continuously from one station to another for performing different operations thereon, whereas the rate and manner in which the eggs are moved at each station is coordinated and adapted to the conditions or types of equipment located at each station. The construction is particularly designed so as to arrange the eggs in the best position for candling.

In the preferred form of the equipment described herein, the eggs are received in bulk, that is in groups of 30 at a time, and are placed on a conveyor with their larger ends upward as they are transferred from a crate or flats at a loading station. The eggs are then arranged and transferred for movement in single file through an egg candling station with the larger ends of the eggs located on the same side of the candler for speedier and more accurate candling. From the candler, the eggs are supplied in multiple rows to egg grading or other equipment. The movement of the eggs is such that each station may operate at the most efficient speed without accumulation or lack of eggs at any location.

Accordingly, the principal object of the invention is to provide novel egg handling or transfer means whereby a continuous and uniform flow of eggs may be maintained through various stations and operations.

Another object of the invention is to provide novel conveying means for eggs whereby the rate and manner of movement of the eggs at different points will be automatically varied.

A specific object of the invention is to supply eggs to a candler with the larger ends of all of the eggs positioned on the same side of the candler.

These and other objects and features of the present invention will appear from the following description thereof wherein reference is made to the accompanying figures of the drawings.

In the drawings:

FIG. 8 is a perspective showing the dividing conveyor and an egg grader of the assembly of FIG. 1; and FIG. 9 is an enlarged view of a portion of the conveyor bar of the egg grader.

Figure 1:
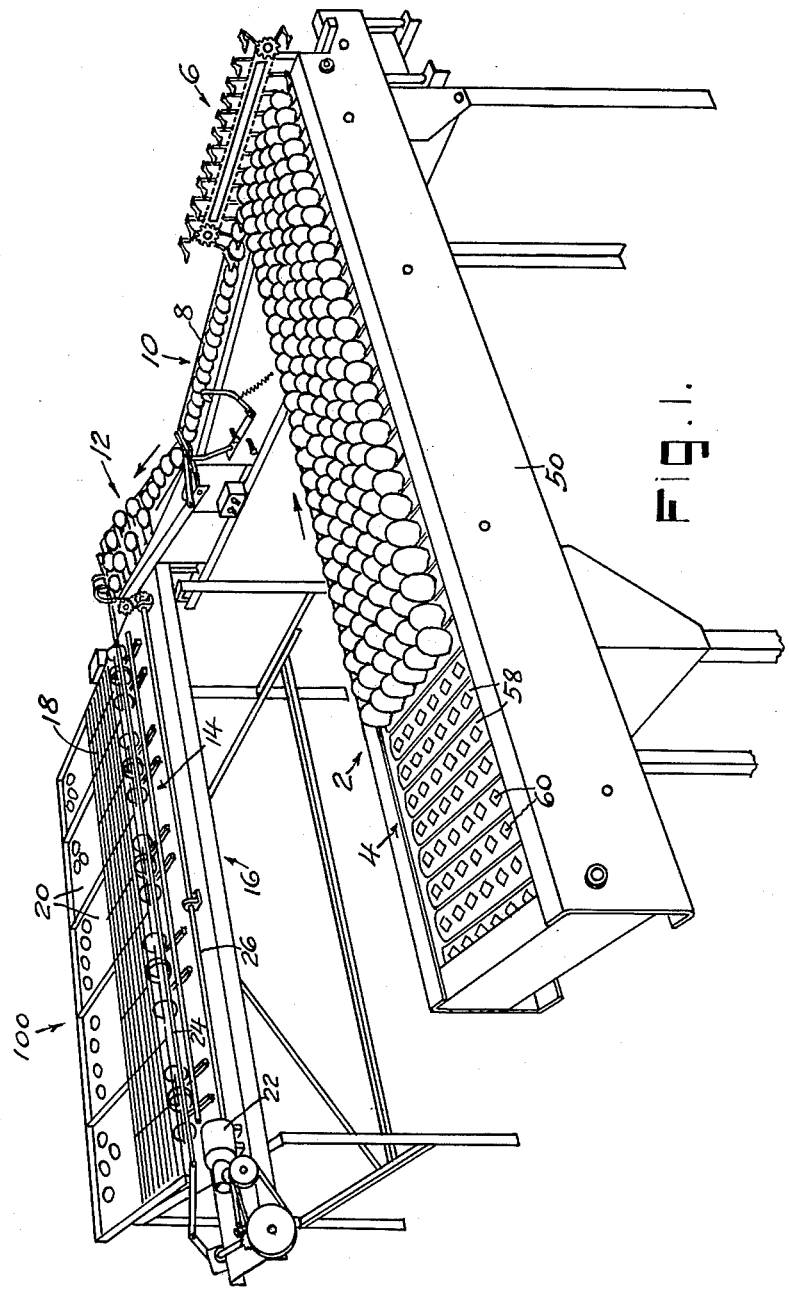
FIG. 1 is a perspective showing a typical egg handling system embodying the present invention.
Figure 3:
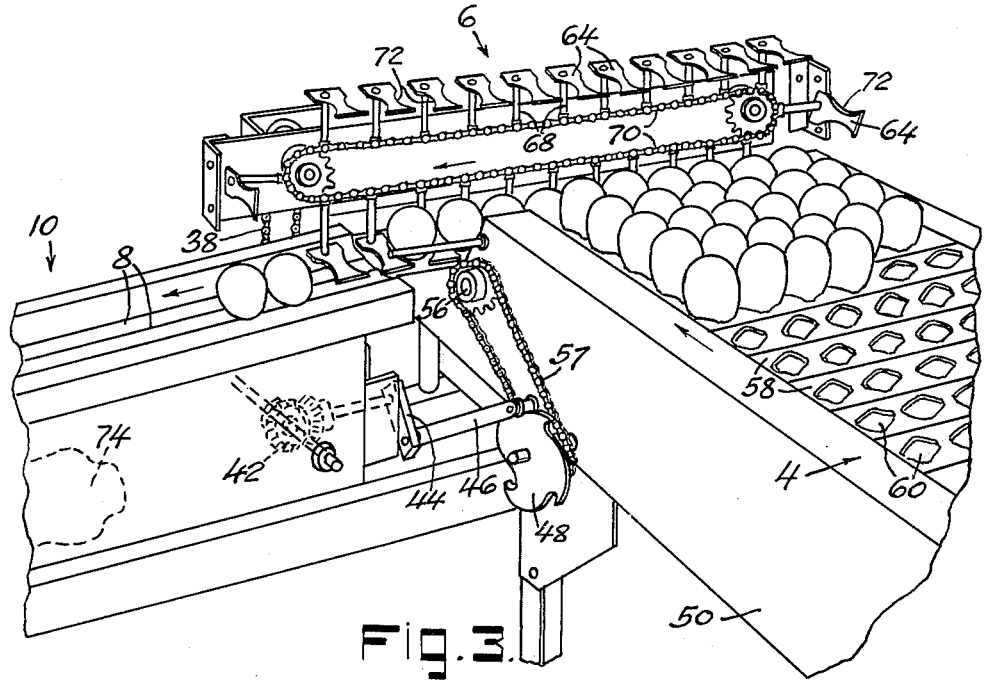
FIG. 3 is an enlarged view showing a portion of the receiving and aligning conveyors embodied in the assembly of FIG. 1.

In that form of the invention chosen for purposes of illustration in the drawings, the assembly includes a loading station 2 where groups or trays of eggs are deposited on a receiving conveyor 4 with their larger ends upward. The eggs are transferred from the delivery end of the receiving conveyor to an aligning conveyor 6 which arranges the eggs in single file and holds the larger ends thereof facing in the same direction. From the aligning conveyor the eggs are caused to move by gravity over tracks 8 at a candling station 10 with their larger ends positioned on one side of the candler. From the candling station 10 the eggs are moved by a dividing conveyor 12 into two rows which are fed to a dual egg grader 14 at the grading station 16. From the grading station the eggs are moved by a take-away conveyor 18 to the trays 20 at a packing station.

Figure 2:
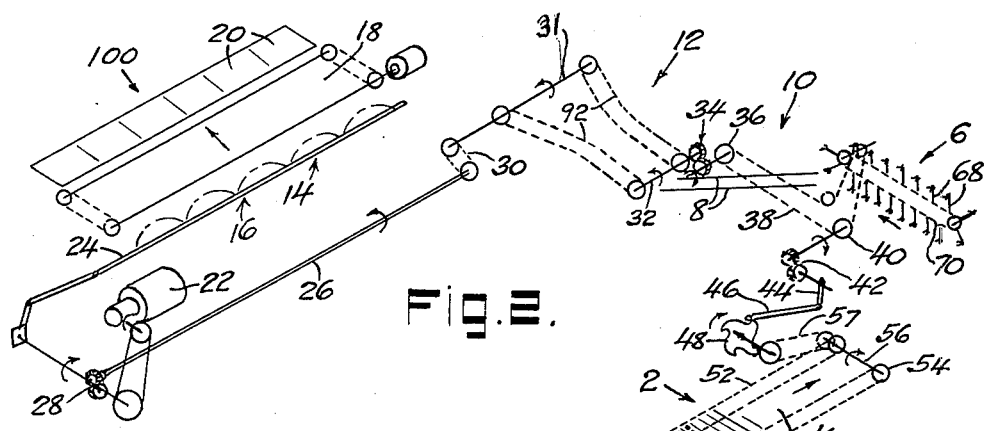
FIG. 2 is a diagrammatic illustration showing the driving connections employed in the assembly of FIG. 1.
Figure 4:
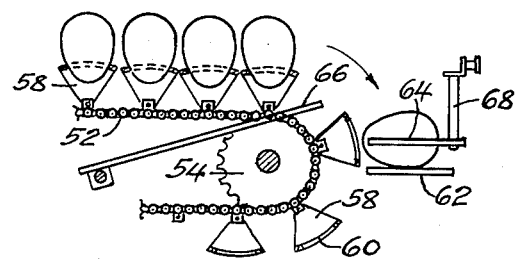
FIG. 4 is a sectional view through a portion of the construction shown in FIG. 3.
Figure 5:
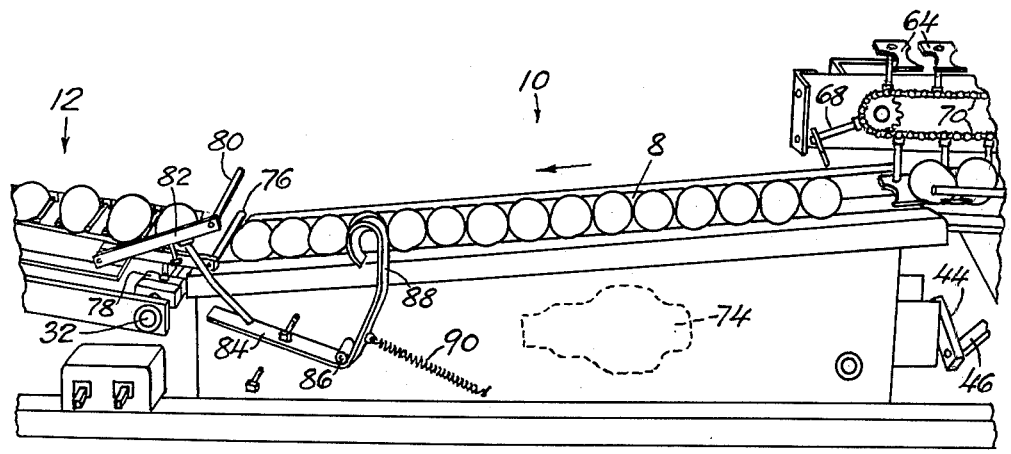
FIGS. 5 and 6 are perspectives showing the construction at the candling station of FIG. 1.

The movement of the eggs to and through each station not only takes place continuously but involves a different arrangement and speed of movement of the eggs at each station for the most efficient handling thereof. A single source of power, such as the motor 22 which drives the egg grader, may be used to coordinate the operation of all of the elements of the assembly. Thus, as shown in FIG. 2 the egg grader is of the type shown in Patent No. 2,246,597 and motor 22 is used to actuate the grader conveyor bar 24. At the same time, the motor 22 drives the shaft 26 through bevel gears 28. The shaft 26 is provided at its opposite end with a chain 30 for driving the shaft 31 of dividing conveyor 12. The dividing conveyor 12 embodies chains 92 which drive shaft 32 at the lower end of the dividing conveyor 12. Chains 92 pass about sprockets on a shaft 32 to which a spur gear 34 is secured. Spur gear 34 drives the sprocket 36 about which a chain 38 passes for actuating the aligning conveyor 6. At the same time, the chain 38 passes about the sprocket 40 which drives bevel gears 42 to actuate crank 44 for operating ratchet arm 46 and ratchet wheel 48 whereby the receiving conveyor 4 is caused to advance step by step when the aligning conveyor 6 has discharged its eggs onto the tracks 8 of the candling station.

The driving connections shown and described are illustrative of those which can be used and have been found in practice to assure uniform operation of all the elements of the assembly so as to maintain the desired supply of eggs at each station without any accumulation or jamming of the eggs at any point.

In the preferred form of the invention shown in the drawings, the receiving station is in the form of a table 50 having the receiving conveyor 4 arranged horizontally near the top thereof. The receiving conveyor has chains 52 at opposite sides thereof which extend about a sprocket 54 at the delivery end thereof. The sprocket 54 is secured to the shaft 56 to which ratchet wheel 48 is attached through chain 57. Therefore, when the ratchet wheel is advanced by operation of ratchet arm 46, the upper run of the receiving conveyor is advanced one step to transfer six eggs at a time from the receiving conveyor 4 to the aligning conveyor 6. For this purpose, the chains 52 of the receiving conveyor are provided with a plurality of transversely extending slats 58 having egg receiving openings 60 therein. These slats, when positioned side by side on the upper run of the conveyor, present egg receiving openings arranged to receive groups of eggs in the same arrangement as they are carried by crates, flats or conventional egg lifting means.

Eggs are normally arranged in egg cases or on flats with the larger end of each egg facing upward. Therefore, the eggs can be transferred onto the receiving conveyor in bulk or groups with the larger ends thereof upward without requiring special handling of the eggs. As the slats 58 pass about the sprocket 54 with the chain 52 they tilt each row of eggs forward so that the eggs fall outward onto a yieldable platform 62 between the plates 64 of the aligning conveyor 6. The larger ends of the eggs are, therefore, positioned on the far side of the platform 62 and are prevented from turning end for end by means of the plates 64 of the aligning conveyor. A blocking bar 66 may be positioned beneath the slats 58 where they pass about the sprocket 54 to prevent small eggs from falling between the slats as they spread apart while dumping the rows of eggs onto the aligning conveyor. It is found in practice that the blocking bar 66 does not cause the eggs to turn end for end as they are transferred from the receiving conveyor to the aligning conveyor.

The plates 64 of the aligning conveyor 6 are carried by posts 68 secured to the chain 70 and projecting downward from the lower run of the chain 70 into positions parallel to the platform 62. The adjacent sides of the plates 64 are cut away as shown at 72 so that they cooperate to form egg guiding recesses which serve to hold the row of eggs deposited on platform 62 with their long axes parallel and with their larger ends on the far side of the conveyor as they are advanced by movement of the aligning conveyor 6 toward the discharge end thereof.

As the plates 64 of the aligning conveyor reach the discharge end of the lower run, the posts 68 on chain 70 swing each plate upward and away from the adjacent horizontal plate and the eggs are thereby pushed forward one after another onto the inclined tracks 8 of the candler. The eggs then roll forward with their axes parallel and without turning end for end so that all of the eggs are presented with their larger ends on the same side of the candler as they move into position to be candled. A light 74 is located below the tracks 8 at the candling station so that the eggs can be inspected quickly and accurately to discover any imperfections. Imperfect eggs can be removed from the tracks 8 whereupon the remaining eggs roll forward without disturbing the arrangement thereof.

An automatic stop member 76 is located adjacent the lower end of the tracks 8 of the egg candler and is automatically raised and lowered by a cam member 78 attached to shaft 32 of the dividing conveyor 12. In this way, one egg at a time is released for movement from the lower ends of the tracks onto the dividing conveyor. Manual stop means are also provided adjacent the lower ends of the tracks 8 in order that the eggs may be retained on the tracks when desired. Such delays may occur when several eggs are defective and must be removed from the tracks by the candler. For this purpose, a manual stop member 80 is carried by an arm 82 which is connected to the lever 84 pivoted at 86 and provided with a handle 88. A spring 90 normally serves to hold the handle and manual stop member 80 in their inactive positions. However, when it is desired to hold the eggs on track 8, the manual stop member 80 may be lowered by manipulation of the handle 88. Thereafter when the eggs are to be released for further movement, the handle 88 is operated to raise the manual stop member 80 whereupon the eggs will again be allowed to move onto the dividing conveyor 12.

The dividing conveyor 12 to which the eggs pass from the lower ends of tracks 8 embodies two chains 92, each of which has pairs of rods 94 secured thereto and extending toward the other chain. Alternate pairs of rods 94 are secured to one of the chains 92, whereas intermediate pairs of rods are attached to the other chain 92. As shown at 93 the upper rod of each pair of rods 92 may be recessed to aid in positioning and holding the eggs as they are carried and separated by the dividing conveyor. The chains and rods travel upward over an inclined platform 96 from positions adjacent the lower ends of tracks 8 where the chains are relatively close together to the upper end of the platform where the chains are relatively far apart. The spacing of chains 92 at the lower end is approximately equal to the length of the rods 94 so that the rods form, in effect, a continuous conveyor. The timing of the operation of automatic stop member 76 is such that one egg is deposited on a pair of rods 94 on one of the chains 92 while the next egg will be deposited on an adjacent pair of rods 94 on the other chain 92. Thereafter, as the chains with their rods and eggs move up the platform 96, they move apart to form two diverging rows of eggs which are supplied at spaced points to the egg grader 14. If desired, a transversely extending bar 97 may be positioned adjacent the upper ends of the dividing conveyor to prevent small eggs from dropping downward between the pairs of conveyor pins and the egg receiving means 98 of the egg grader.

Figure 6:
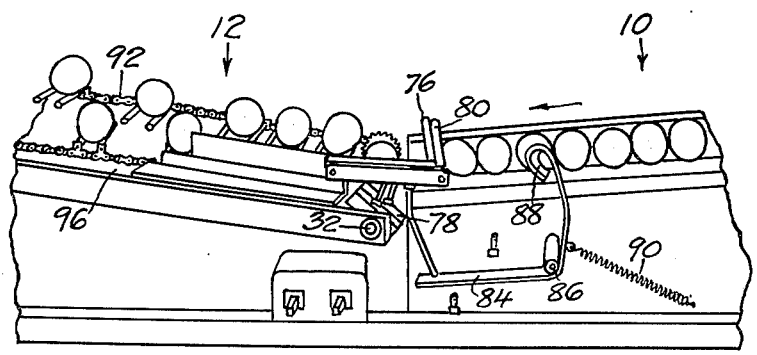
Figure 7:
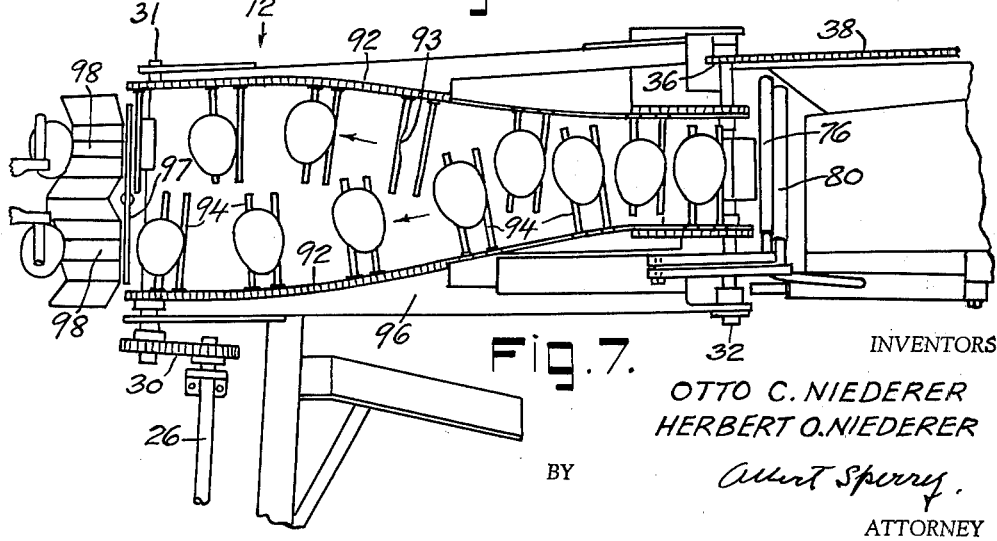
FIG. 7 is a plan view of the dividing conveyor embodied in the assembly of FIG. 1.

The egg grader illustrated is of the dual type shown in FIG. 6 of Patent No. 2,246,597 and embodies two adjacent stationary egg receiving means 98 on which eggs are deposited by the dividing conveyor 12. The eggs are then picked up and advanced through the egg grader by the conveyor bar 24 driven by motor 22. As shown in FIG. 9, the conveyor bar 24 is preferably provided with cavities or recesses 99 that are positioned to receive and hold the eggs as they are advanced. Such cavities prevent the egg from moving lengthwise of the conveyor bar whereby the conveyor can be operated at faster speeds than has been possible heretofore. The eggs, as graded, are deposited on a take-away conveyor 18 which is preferably of the type shown in Patent No. 2,843,250 and are moved by the take-away conveyor to trays 20 at the packing station 100.

The assembly thus provided serves automatically to move and arrange eggs at different speeds and in different manners adapted to their handling in the most efficient manner at each station as they progress from the loading station 2 to the packing station 100. There are no delays in their movement whereby the eggs are handled at a maximum rate consistent with the operations to be performed. Accordingly, each type of equipment in the combination can be operated at full capacity at all times. Moreover, the means provided for positioning the larger ends of all eggs on the same side of the candler permits more rapid candling of the eggs than has been possible heretofore.

While the assembly shown embodies an egg grader to which the eggs are supplied by the dividing conveyor, the dividing conveyor may be employed to supply eggs to egg cleaners, egg washers, egg packers, egg crackers or to various other types of egg handling equipment. Where the eggs from the candler are to be supplied to equipment having more than two inlet channels, each side of the dividing conveyor 12 may supply eggs to additional dividing conveyors. In this way, the eggs can be presented in any desired multiple arrangements for further handling in other types of equipment as required in any particular assembly or installation. In the alternative, the dividing conveyor may be arranged in the reverse relation in the assembly so as to receive eggs from two separate or parallel egg candlers or other sources and serve to bring the eggs from both sources together into a single file for handling by other equipment.

The driving means employed for each of the conveyors in the assembly shown is coordinated by employing a single motor with suitable driving connections. However, multiple motors and other types of driving connections may be employed and synchronized to effect the desired continuity with varying rates of movement of the eggs.

The equipment also may be used in handling, sorting or arranging other types of articles in continuous assembly line operations. In view thereof it will be apparent that the combination and arrangement of the elements and the form and construction thereof are capable of many variations and adaptations. It should, therefore, be understood that the particular embodiment of the invention shown in the drawings and described above is intended to be illustrative only and is not intended to limit the scope of the invention.

We claim:

1. A dividing conveyor comprising two chains arranged in diverging relation with article receiving means thereon movable into and out of interfitting relation, means for supplying articles in single file to said article receiving means at a point where said chains are relatively close together and the article receiving means are in interfitting relation, and spaced means to which articles are supplied from said article receiving means when the chains are spaced relatively far apart.

2. Means for converting a single row of articles into multiple rows of articles comprising a pair of chains arranged in diverging relation and having article receiving means thereon positioned to move into and out of interfitting relation, means for supplying articles in single file to said article receiving means when said article receiving means are in said interfitting relation and means for receiving articles from said article receiving means when the latter are spaced apart.

3. In combination with a first egg handling device having two inlet channels, a second egg handling device, means for moving eggs in a single row past said second egg handling device, a dividing conveyor positioned to receive eggs from said single row and to supply said eggs to both said inlet channels of the first egg handling device, said dividing conveyor embodying two chains arranged in diverging relation, each of said chains having egg receiving means carried thereby, the egg receiving means on one of said chains being arranged in alternate interfitting relation with respect to the egg receiving means on the other chain at a point adjacent said single row of eggs so that successive eggs from said single row will be received by the egg moving means on different chains, said chains being spaced apart adjacent said two egg receiving channels of the first egg handling device and serving to supply eggs to each of said two inlet channels.

References Cited in the file of this patent

UNITED STATES PATENTS

| | | |
|---|---|---|
| 2,124,397 | Gwinn | July 19, 1938 |
| 2,531,292 | Page | Nov. 21, 1950 |
| 2,619,216 | Kinnicutt | Nov. 25, 1952 |
| 2,684,748 | Sneed | July 27, 1954 |
| 2,687,802 | Davis | Aug. 31, 1954 |
| 2,704,146 | Reck | Mar. 15, 1955 |
| 2,838,161 | Page | June 10, 1958 |
| 2,843,250 | Niederer | July 15, 1958 |
| 2,919,787 | Reck | Jan. 5, 1960 |
| 2,923,395 | Hofe | Feb. 2, 1960 |